US010282211B2

(12) United States Patent
Parmar et al.

(10) Patent No.: US 10,282,211 B2
(45) Date of Patent: May 7, 2019

(54) OPERATING SYSTEM SOFTWARE INSTALL AND BOOT UP FROM A STORAGE AREA NETWORK DEVICE

(71) Applicant: Avago Technologies International Sales Pte. Limited, Singapore (SG)

(72) Inventors: Vinodkumar Rameshbhai Parmar, Bangalore (IN); Sanjeev Kumar Roy, Bangalore (IN); Phil Truong, Garden Grove, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 560 days.

(21) Appl. No.: 14/887,154

(22) Filed: Oct. 19, 2015

(65) Prior Publication Data

US 2016/0203000 A1    Jul. 14, 2016

Related U.S. Application Data

(60) Provisional application No. 62/101,902, filed on Jan. 9, 2015.

(51) Int. Cl.
*G06F 9/44* (2018.01)
*G06F 9/445* (2018.01)
*H04L 29/08* (2006.01)
*G06F 9/4401* (2018.01)

(52) U.S. Cl.
CPC .......... *G06F 9/4416* (2013.01); *G06F 9/4406* (2013.01); *H04L 67/1097* (2013.01); *H04L 67/34* (2013.01)

(58) Field of Classification Search
CPC . G06F 9/4416; G06F 9/4406; H04L 67/1097; H04L 67/34
See application file for complete search history.

(56) References Cited

U.S. PATENT DOCUMENTS

| 7,421,621 | B1 * | 9/2008 | Zambrana | G06F 11/3612 |
| | | | | 714/38.14 |
| 2007/0073875 | A1 * | 3/2007 | Goto | G06F 11/1076 |
| | | | | 709/224 |
| 2014/0032889 | A1 * | 1/2014 | Koenen | G06F 9/4416 |
| | | | | 713/2 |

* cited by examiner

*Primary Examiner* — Abdulkader M Alriyashi
(74) *Attorney, Agent, or Firm* — Sheridan Ross P.C.

(57) ABSTRACT

Methods and apparatus are disclosed to install and boot computer servers with operating system software stored in boot logical units (LUNs) of a storage area network device. For each converged network adapter (CNA) in each computer server, provisioning server boot support is enabled to download operating system images by using a first computer communication protocol. Storage boot support is enabled to map a boot logical unit (LUN) in a targeted storage area network device to the converged network adapter and computer server. The boot LUN is mapped to a storage function of a converged network adapter port of the CNA. The computer server is then booted with the operating system that was stored in the boot LUN.

17 Claims, 15 Drawing Sheets

OPERATING SYSTEM SOFTWARE INSTALL AND BOOT UP FROM A STORAGE AREA NETWORK DEVICE

CROSS REFERENCE TO RELATED APPLICATIONS

This patent application claims the benefit of U.S. Provisional Patent App. No. 62/101,902 entitled OPERATING SYSTEM SOFTWARE INSTALL AND BOOT UP FROM A STORAGE AREA NETWORK DEVICE, filed on Jan. 9, 2015 by Vinodkumar Parmar et al.

FIELD

The embodiments generally relate to booting up a computer server with operating system (OS) software.

BACKGROUND

Loading and booting operating systems on a new computer server can take quite some time. Often it has to be performed by a computer administrator or information technology specialists on site local to the computer server at a data center. The time involved to load and boot operating systems on site can limit how a computer server may be used in a data center.

Data centers often have one or more storage area network devices in communication with a computer server over a local area network where data can be stored. However, communication between the storage area network devices and computer servers is often with a storage area networking protocol and over specialized storage cables to provide a storage function. Large files sizes are sometimes transferred between the storage area network devices and computer servers at high data rates.

In contrast, Ethernet cables and an Ethernet communication protocol is most often used in a network for general network communication. Small file sizes are often transferred using Ethernet communications protocols over the internet, such as email for example. Transferring large file sizes, such as an operating system, can take quite some time using Ethernet communications protocols over the internet.

Remote client users may desire to use different types or versions of operating systems on a computer server. For example, one remote client user may desire to use a Linux virtual machine in a computer server while another remote client user may desire to use Microsoft Windows in the same computer server.

A first computer server may experience a failure, be overloaded, or require upgrading and a second computer server needs to be started up to provide the same operating systems and virtual machines to remote client users. Loading a plurality of operating system software into the second computer server over a standard network connection may take considerable time that can inconvenience remote client users.

BRIEF SUMMARY

The embodiments of the invention are summarized by the claims that follow below.

BRIEF DESCRIPTIONS OF THE DRAWINGS

Embodiments of the invention will be described with reference to the Figures, in which like reference numerals denote like elements and in which.

Figure 10:
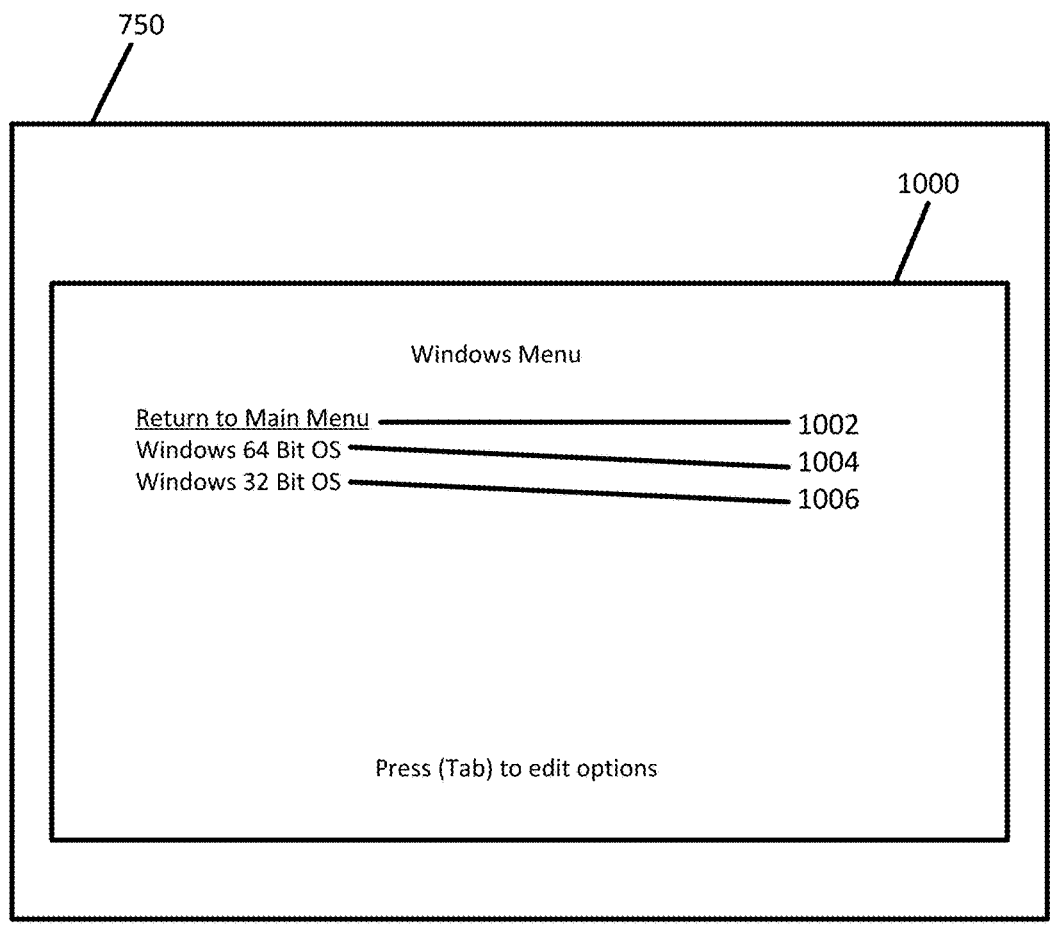

FIG. 10 it a diagram of the display device displaying a hardware specific operating system user interface window that may be associated with the selected type of operating system software.

Figure 11:
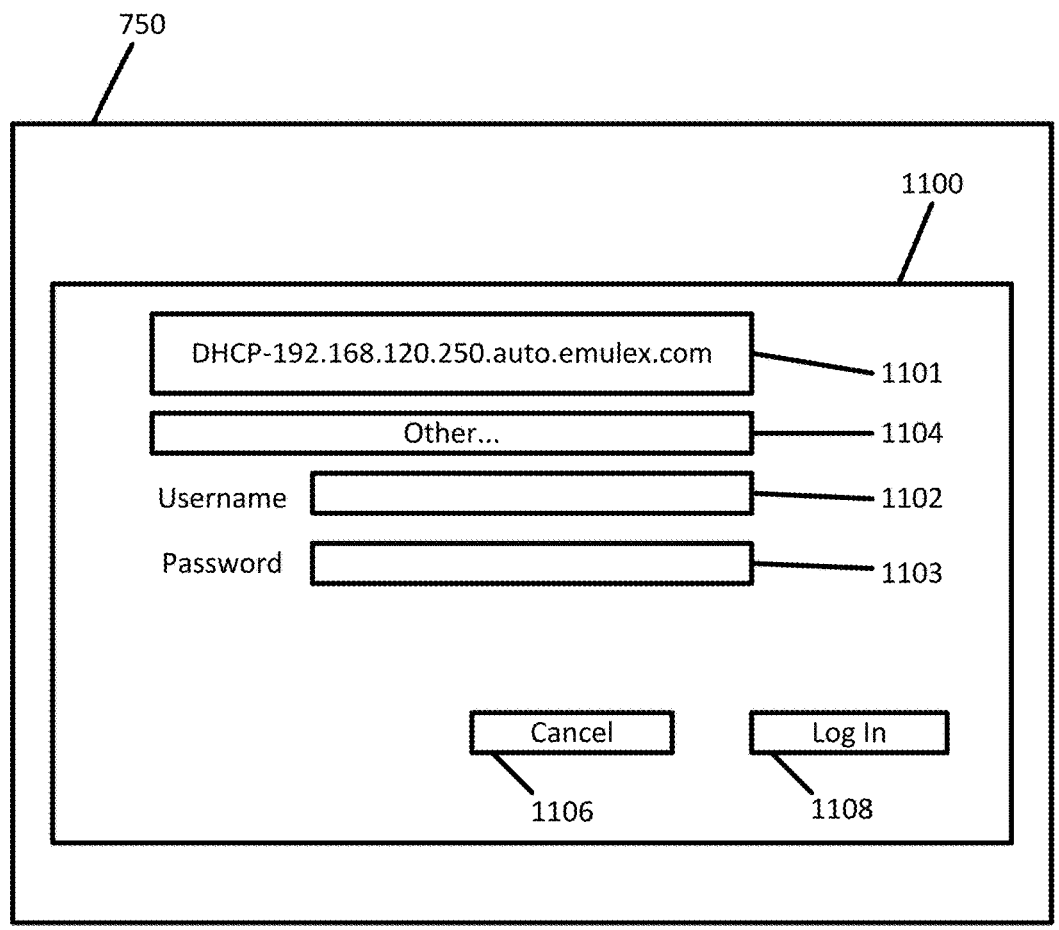

FIG. 11 illustrates a diagram of the display device displaying a login user interface window.

Figure 12:
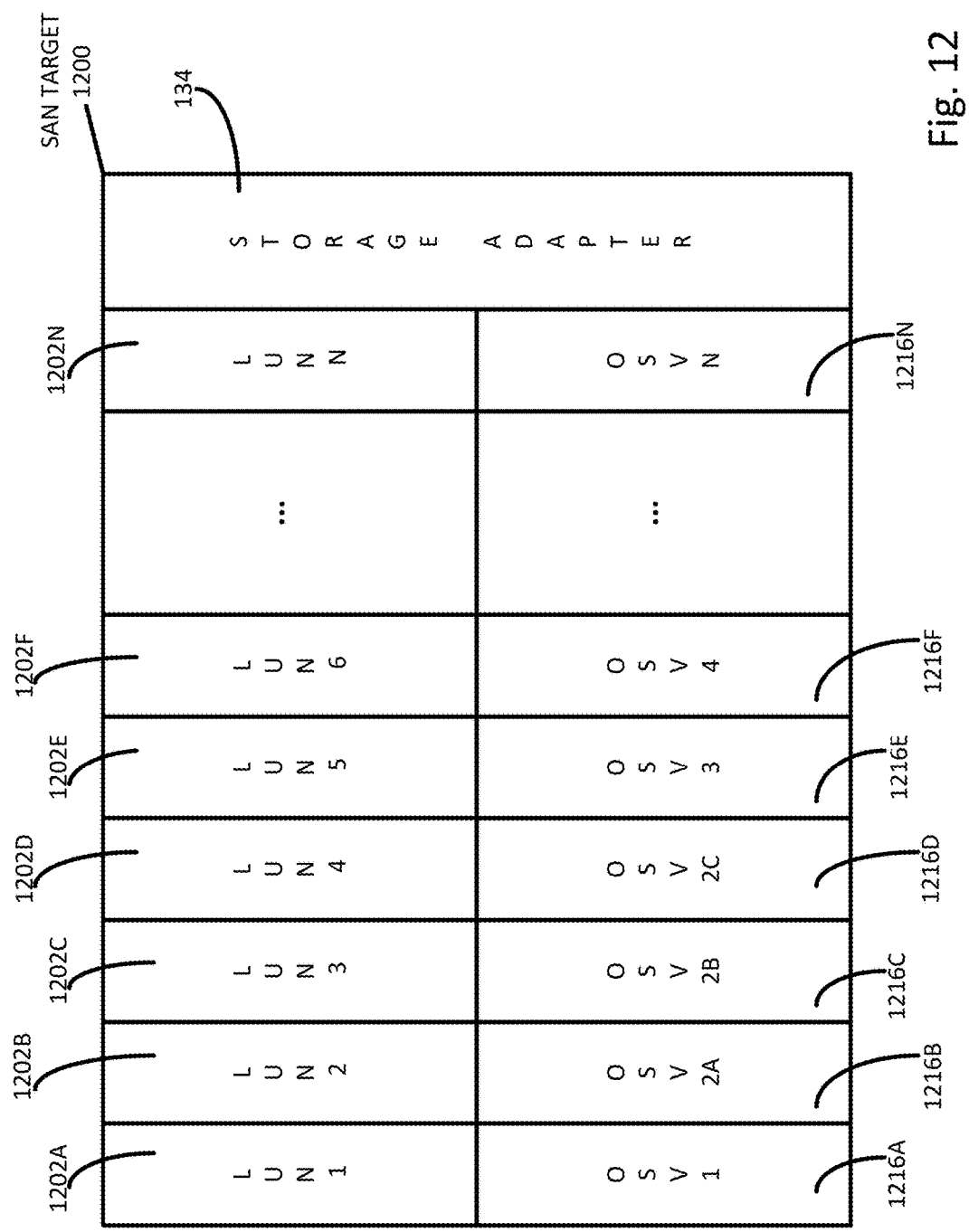

FIG. 12 is a block diagram illustrating logical unit number assignment to respective operating system images stored in a targeted storage area network (SAN) device for resident computer servers associated with a single tenant of a computer network in a data center.

Figure 13:
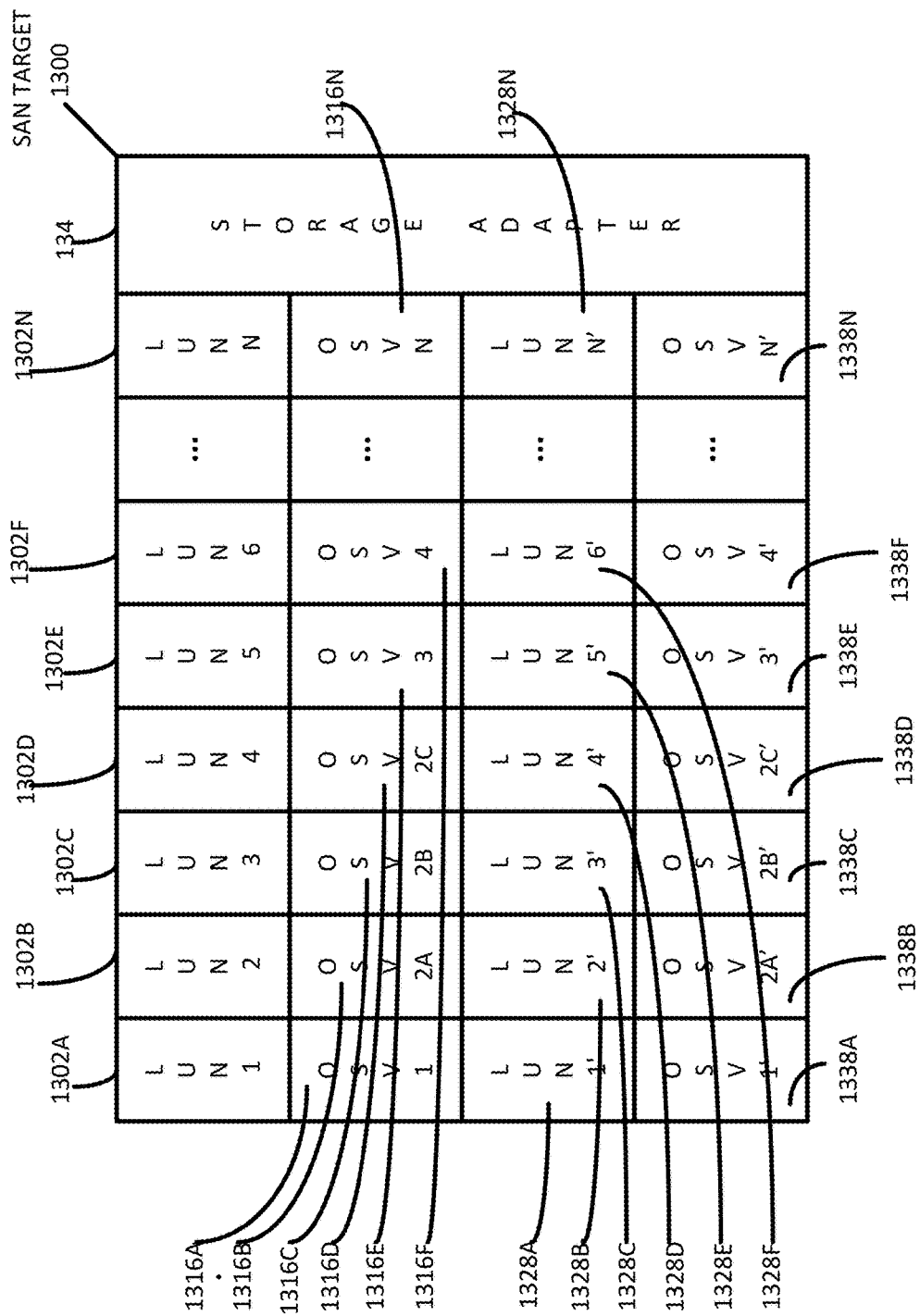

FIG. 13 is a block diagram illustrating logical unit number assignment to respective operating system images stored in a targeted SAN device for groups of computer servers associated with different tenants of a computer network in a data center.

DETAILED DESCRIPTION

In the following detailed description of the embodiments, numerous specific details are set forth in order to provide a thorough understanding of the embodiments. However, it will be obvious to one skilled in the art that the embodiments may be practiced without these specific details. In other instances well known methods, procedures, components, and circuits have not been described in detail so as not to unnecessarily obscure aspects of the embodiments.

Introduction

Methods, apparatus and systems are disclosed to improve storage area network (SAN) functionality in a data center with storage area network devices providing local/remote storage area networking and data storage. Improved functionality of the storage area network (SAN) devices includes installation and/or updating of the operating systems (OS) software associated with a computer server. The operating systems (OS) software, including other boot resources, is stored in logical units (LUN's) of the SAN device. The boot resources are external boot resources and need not be internal boot resources resident on the targeted computer server. The boot resources assist in the boot-up, the first execution, of an operating system by a processor or computer.

In some embodiments, a local or remote provisioning server is utilized as the command and control authority for managing the operating system software of the computer servers and/or virtual machines in a data center. The provisioning server manages the events surrounding an operating system install, execution and the associated upgrades to the operating system software. The provisioning server utilizes stored operating system (OS) resources, including one or more various types and one or more various versions of operating system software, stored in one or more boot LUNs of a SAN device.

A user, such as a computer administrator or information technology (IT) specialists, can locally or remotely execute software in the provisioning server as the control authority for the install and upgrade of one or more different types or versions of OS software on a plurality servers in the network of a data center. The user can execute the various OS installs and/or OS upgrades in a simultaneous fashion, resulting in a substantial reduction of the time necessary for the completion of the install or update of the OS for each computer server and/or virtual machine in the network. The user can remotely execute the provisioning software by using a remote computer to remotely log into the provisioning server.

The provisioning server has a number of operating system (OS) images that are file-based disk images that have compressed packages of one or more related operating system software files. The OS images are typically captured in advance from a reference computer system where the operating system software has already been installed and configured and may further include software applications, updates, and metadata. Operating system (OS) install packages are file packages created by using the source files of the operating system software, OS install packages are typically used to deploy an operating system from scratch using an install or setup BIOS program. OS install packages need not be decompressed. OS images are typically stored on a storage device, read by a BIOS program, temporarily loaded into memory, decompressed, and stored back onto the storage device in an executable form as the operating system software that can be booted.

Installing an operating system means reading an OS image or OS install package from one storage device and writing the OS image or OS install package into another storage device associated with a processor that will execute the operating system software. The processor decompresses an OS image into executable operating system software that is stored on the storage device. The processor may pull one or more executable files from an OS install package and store them on the storage device forming the executable operating system software thereon. Accordingly, operating system, operating system image, and/or operating system software may be used interchangeably herein because either an OS install package with OS software or an OS image with compressed OS software may be downloaded/uploaded and installed onto a computer or computer server.

Computer Network with SAN Boot LUNs

Figure 1A:
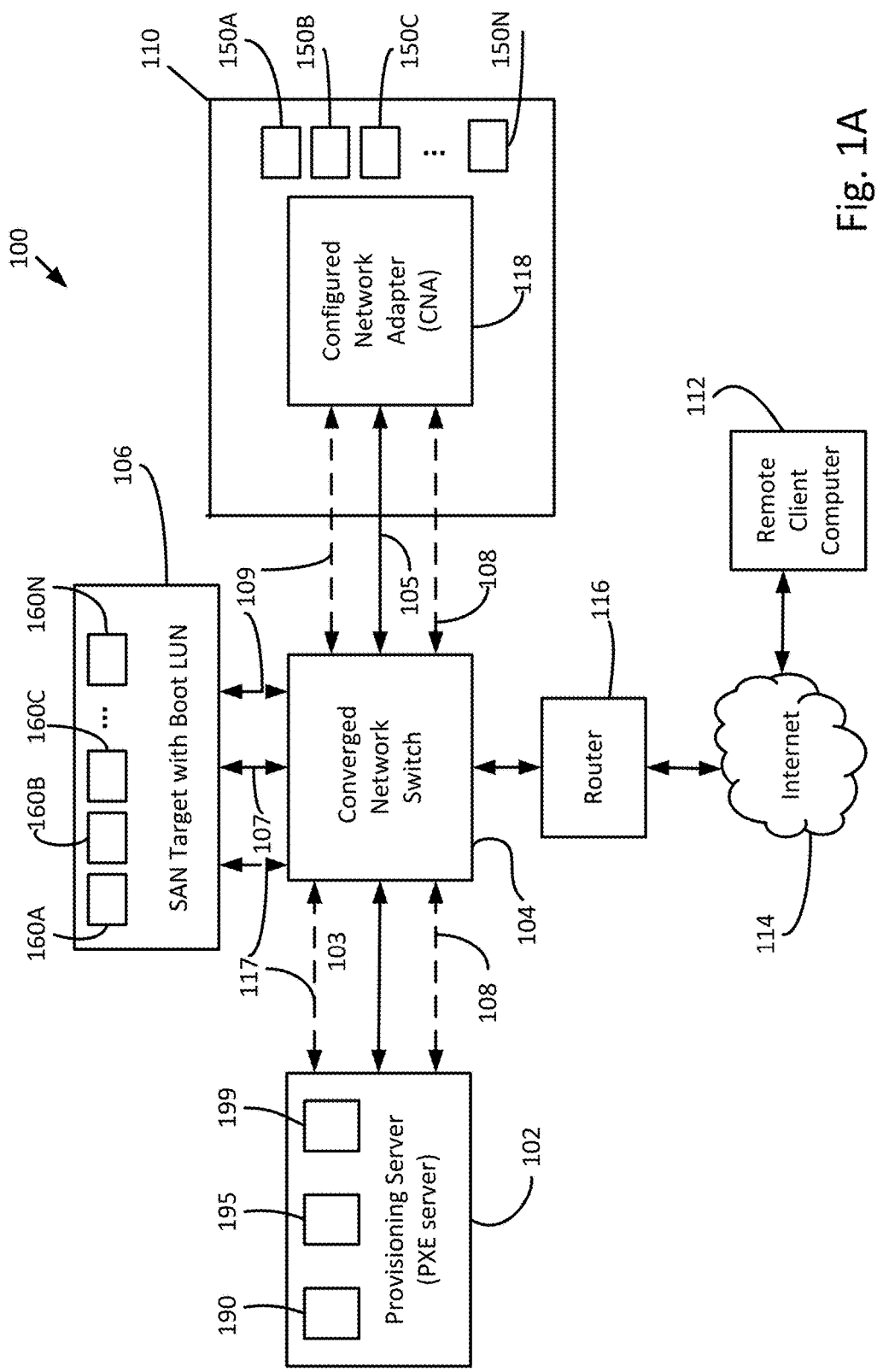
FIG. 1A illustrates a block diagram of a computer network configured for installing and booting selected operating system software on one or more computer servers.

Referring now to FIG. 1A, a block diagram of a local area network (LAN) computer system 100 is illustrated. The computer system 100 may couple to one or more remote clients 112 through a router 116 over a different computer communication network 114, such as the World Wide Web or Internet. The computer system 100 may be hosted in a data center.

The computer system 100 may also be referred to herein as a storage area network because it includes one or more storage area network (SAN) devices 106. Alternatively, the computer system 100 may be simply referred to as a local area network (LAN). The computer system 100 further includes a provisioning server 102, a converged network switch (CNS) 104, and one or more computer servers 110. A computer server 110 with a plurality of processors or a multiprocessor may be provisioned to execute software, such as a hypervisor, to provide a plurality of virtual machines 150A-150N. Prior to the one or more computer servers 110 being active, they may be configurable upon which to provision operating system software and application software, as well as provision hardware resources such as memory and processors.

At least one of the one or more storage area network (SAN) devices 106 in the computer network is provisioned to have one or more boot logical units (LUNs) 160A-160N. Portions of the storage capacity of the SAN device 106 are designated to be boot logical units. A boot logical unit (LUN) may be protected so that it is not overwritten in the ordinary course of using the SAN device. Storage communication protocols and storage area networks with SAN devices typically provide higher bandwidths and are usually well suited to handling large amounts of data, such as the large file sizes of operating system software images. Accordingly, a computer server 110 can more efficiently download and boot up an operating system image from a boot LUN in the SAN device 106 than receiving it directly from the provisioning server 102. Moreover, if a plurality of operating systems are to be concurrently downloaded and booted up on a plurality of computer servers and/or virtual machines therein, the use of multicast packets can further the efficiency in the download and boot up an operating system image from a boot LUN in the SAN device 106.

The converged network switch (CNS) 104 supports multiple computer networking communication protocols for its connecting ports including a standard network communications protocol, such as Ethernet communications protocol of a traditional network interface adapter or card (NIC); and one or more storage network communications protocols, such as internet small computer system interface (iSCSI) communications protocol, and Fibre-Channel over Ethernet (FCoE) communications protocol. Accordingly, the converged network switch (CNS) 104 concurrently supports the plurality of communication protocols that are used to command and control, download, and install operating system software into the computer servers 110. In one embodiment, the converged network switch 104 is a ten (10) gigabit converged network switch supporting a data rate of ten (10) gigabits per second. In another embodiment, the converged network switch 104 is a one hundred (100) gigabit converged network switch supporting a data rate of one hundred (100) gigabits per second. One of ordinary sill recognizes other switch types may be used as the converged network switch 104.

The provisioning server 102 is coupled to the converged network switch (CNS) 104 by one or a pair of Ethernet cables 103. Each of the one or more storage area network (SAN) devices 106 is coupled to the CNS 104 by different Ethernet cables or different pairs of Ethernet cables 107. Each of the one or more computer servers 110 is coupled to the CNS 104 by different Ethernet cables or different pairs of Ethernet cables 105.

Each computer server 110 includes a converged network adapter (CNA) device 118 into which the Ethernet cables 105 plug into. Like the CNS 104, the converged network adapter (CNA) device 118 supports multiple computer networking communication protocols for its connecting ports such as Ethernet communications protocol, internet small computer system interface (iSCSI) communications protocol, Fibre-Channel over Ethernet (FCoE) communications protocol, and remote direct memory access (RDMA) communications protocol. Each computer server 110 is coupled to the CNS 104 by its converged network adapter (CNA) 118.

The provisioning server 102 may include a plurality of boot images for computers and computer servers, including operating system images, software applications, settings, etc., that may have been previously formed and tested on a reference computer system or reference computer server. Alternatively, the boot images may be operating system install packages. In one embodiment, the provisioning server 102 pushes a boot or operating system image through the converged network switch 104 and into one or more of the boot LUNs 160A-160N of the storage area network device 106 using a virtual connection 117 and a fiber channel over Ethernet protocol or Ethernet directly. In an alternate embodiment, the provisioning server 102 pushes a boot or operating system image through the converged network switch 104 and the converged network adapter 118 and into one or more of the boot LUNs 160A-160N of the storage area network device 106 using a virtual connection 108 and a network communication protocol, and a virtual connection 109 using an FCoE protocol or an iSCSI protocol.

Figure 1B:
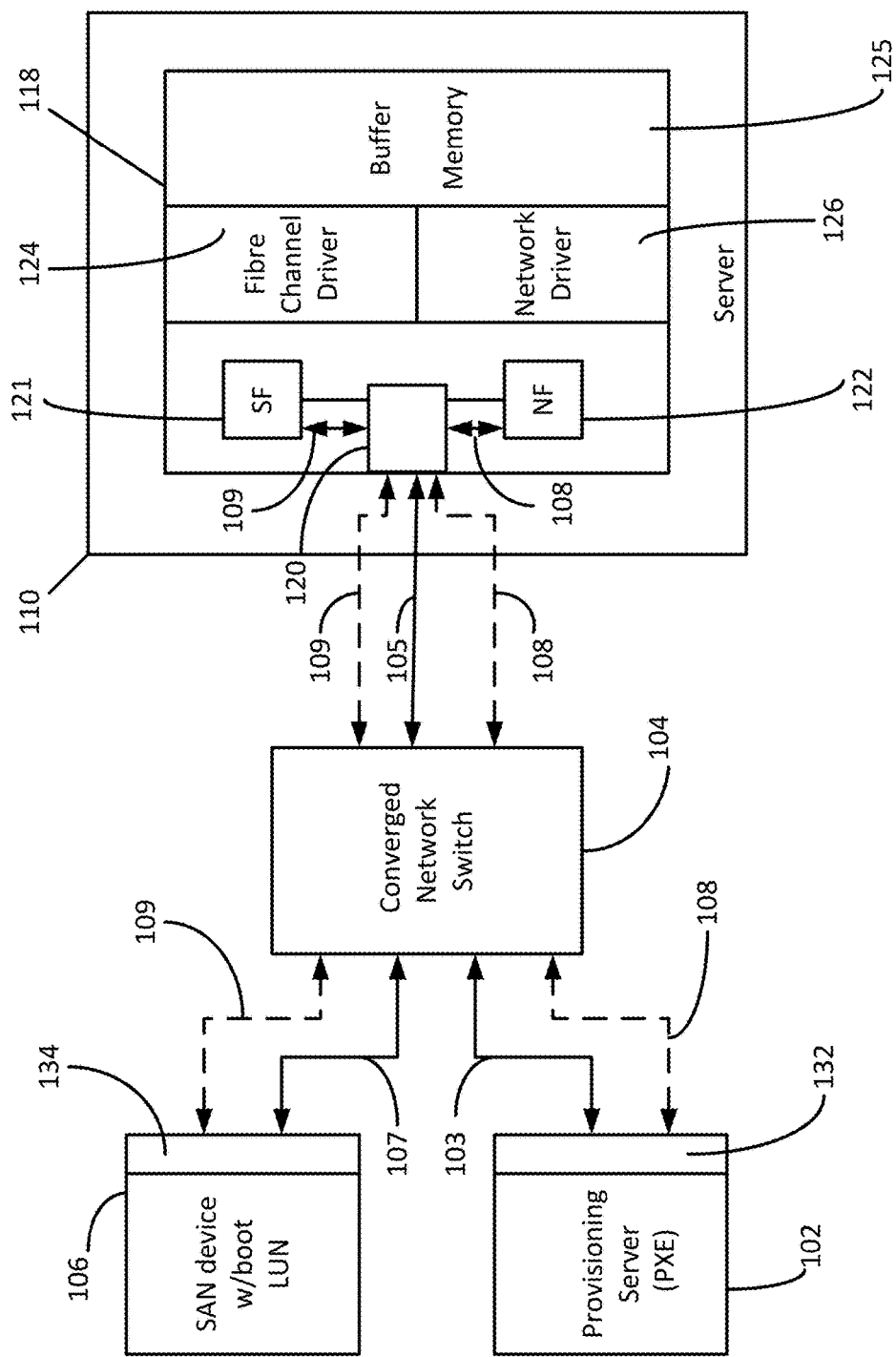
FIG. 1B illustrates a block diagram of a portion of the computer network of FIG. 1A with additional detail of a converged network adapter (CNA) being shown.

Referring momentarily to FIG. 1B, each computer server 110 may be virtually coupled to the one or more SAN devices 106 through a virtual storage connection 109 through the CNS 104 provided by a storage function of the CNA device 118 and a storage adapter 134 using a storage communication protocol (e.g., iSCSI, FCoE). Messages and data may be passed between a computer server 110 and a SAN device 106 using the virtual storage connection 109 such as to download OS software from the boot LUN on the SAN device 106 to the server 110 in response to commands from the provisioning server 102, for example.

In FIG. 1B, each computer server 110 may be virtually coupled to the provisioning server 102 through a virtual network connection 108 through the CNS 104 provided by a network function 120 of the CNA device 118 and a network adapter 132 using a network communication protocol (e.g., Ethernet). Messages and data may be passed between a computer server 110 and the provisioning server 102 using the virtual network connection 108 such as to receive an OS software image from the provisioning server 102 for example.

Referring back to FIG. 1A, the provisioning server 102 executes provisioning software 199 to install and upgrade one or more different types and/or versions of OS software on the one or more servers 110. In one embodiment where the OS to be installed is pulled down, the computer server 110 issues commands to the provisioning server 102 to download OS software from the provisioning server 102 to the boot LUN in the SAN device 106 to the selected computer server 110. In another embodiment where the OS to be installed is pushed out, the provisioning server 102 may issue commands to the computer server 110 to download OS software from the boot LUN to the selected computer server 110.

The computer server 110 into which new operating system software is to be installed may also be referred to herein as the targeted server. The SAN device 106 that provides the boot LUN from which the operating system software may be downloaded or copied, may also be referred to herein as the SAN target or the targeted SAN.

A remote user, such as a computer administrator or information technology (IT) specialists, at a remote client computer 112 can remotely login and remotely control the provisioning software 199 and the provisioning server 102. The remote user can remotely control the provisioning software 199 and the provisioning server 102 to install and upgrade of one or more different types or versions of OS software on a plurality servers in a network of a data center. The user can execute the various OS installs and/or OS upgrades in a simultaneous fashion, resulting in a substantial reduction of the time necessary for the completion of the install or update of the OS for each computer server 110 in the network.

When properly networked together, one or more devices in a computer network can be deemed either local or remote depending upon the position of the firewall of the router even when in the same data center. The benefit of the various configurations allows for greater management flexibility and capabilities when dealing with a large data center format where a single provisioning server 102 may be a remote server and can be utilized for the global management of a plurality of servers running a unique operating system that is deployed (installed and booted) by a connection to a specific boot LUN on the one or more SAN devices 106.

Referring now to FIG. 1B, a block diagram of the computer system 100 is shown with additional details of the configuration and architecture of the CNA device 118 in each computer server 110. Each CNA device 118 includes one or more converged network adapter ports 120 each of which includes a storage function 121 associated with a fiber channel driver 124 and a network function 122 associated with a network driver 126. The storage function 121 and associated storage driver 124, such as a fiber channel driver, are used to communicate by using storage packets via a storage communication protocol, such as a Fiber-Channel over Ethernet (FCoE) communication protocol. The network function 122 and associated network driver 126 are used to communicate by using Ethernet packets and an Ethernet protocol.

Digital signals representing packeted messages or packeted data signals (see FIG. 5 for example) according to a predetermined communication protocol flow through the CNS 104 and the Ethernet cables 105 into the CNA 118. The source IP address designates from where the digital signals are being sent, such as from a provisioning server 102 or from a SAN device 106. The destination IP address designates where the digital signals are to be delivered, such as a computer server 110.

As shown in FIG. 1B, the CNA 118 of a computer server 110 includes one or more network adapter ports 120, each of which includes a storage function 121 and a network function 122 so that multiple communication protocols are supported within the computer system network 100. The storage function 121 of each network adapter port 120 is supported by a storage software driver 124. The network function 122 of each network adapter port 120 is supported by a network software driver 126. The CNA 118 includes a buffer memory 125 to temporarily store IP packets, including multicast IP packets, for later processing or transmission.

If a communications adapter does not support the predetermined communication protocol or if it is not addressed to the given communications adapter and computer server, the digital signals and the data or message packed therein is ignored by the computer server. Assuming the communications adapter supports the predetermined communication protocol and the data or message is addressed to the given communications adapter and computer server, the packeted messages or packeted data signals are depacketized according to the predetermined communications protocol to extract the messages or data signals therein.

If addressed to the computer server, a determination is made as to what type of packet (e.g., a storage packet/signal or network interface packet/signal) predetermined communication protocol was used to send the packet. If the packet/signal is determined to be a storage packet/signal, such as an FCoE packet/signal or an iSCSI packet/signal, then the message is routed to the storage function (SF) 121 for processing by the storage software driver 124 and then delivered to one or more processors in the server 110. If the packet/signal is determined to be a network interface packet/signal, such as a TCP or UDP packet/signal, it is routed to the network function (NF) 122 for processing by the network software driver 126 and processed by one or more processors in the computer server 110. If the network interface packet/signal is determined to be a boot message, the CNA 118 may act and generate a download message in a network packet/signal in response to the network function 122 and the network software driver 126. The download message may be sent from the CNA 118 over the virtual connection 109 to the SAN device 106 through the CNS 104 and the cables 105,107.

The data representing the operating system image may be uploaded into a boot LUN and downloaded from the boot LUN through the CNS 104 and the cables 105,107 by using the virtual connection 109 and back into the computer server 110 for one or more processors 150A-150N with storage packet/signals. In this case, the storage packet/signals are uploaded/downloaded through the storage function 121 and the storage software driver 124 by using a storage communication protocol.

FIG. 1B illustrates one CNA 118 in a computer server 110. However, a plurality of CNAs 118 may be instantiated into one or more computer servers 110 forming a plurality of virtual connections to one or more SAN devices.

Figure 2:
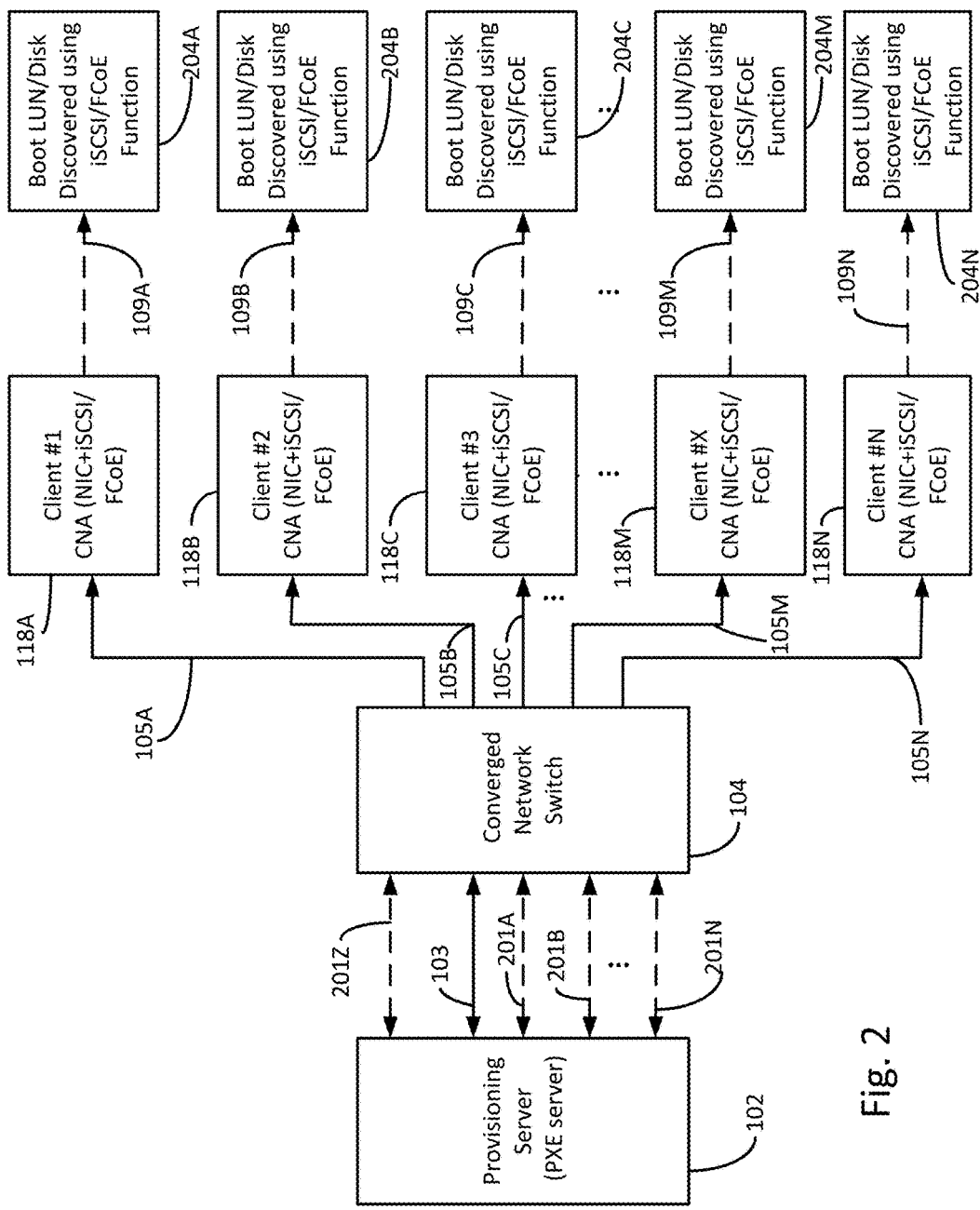
FIG. 2 illustrates a diagram of the provisioning server transmitting a plurality of unicast packets and alternatively transmitting a multicast packet to the converged network switch for delivery to a plurality of converged network adapters of a plurality of computer servers.

Referring now to FIG. 2, the provisioning server 102 is coupled in communication with a plurality of converged network adapters (CNA) 118A-118N of one or more computer servers 110 through the network interconnection cable (NIC) 103 (such as an Ethernet cable or fibre optic cable), the converged network switch 104, and a plurality of network interconnection cables (NIC) 105A-105N (such as Ethernet cables and/or fibre optic cables). A plurality of virtual connections 109A-109N may be discovered and formed between the plurality of converged network adapters (CNA) 118A-118N and a respective plurality of boot LUNs 204A-204N of one or more SAN devices 106 by using the storage function 121 of each CNA 118A-118N.

A plurality of boot messages 201A-201N may be sent from the provisioning server 102 through the CNS 104 to the respective plurality of CNAs 118A-118N and their computer servers. The CNAs 118A-118N further process the boot messages and use the virtual connections 109A-109N to the respective boot logical units (LUN) 204A-204N and a storage communication protocol (e.g., iSCSI or FCoE) to issue a LUN instruction to install/download an operating system image to/from the boot LUNs into the respective computer server 110. The computer server 110, and one or more virtual machines therein, may then boot up a desired operating system by using the downloaded operating system image obtained from the respective boot LUNs.

Multicast Internet Protocol Packets and Operating System Image Installation

Figure 3A:
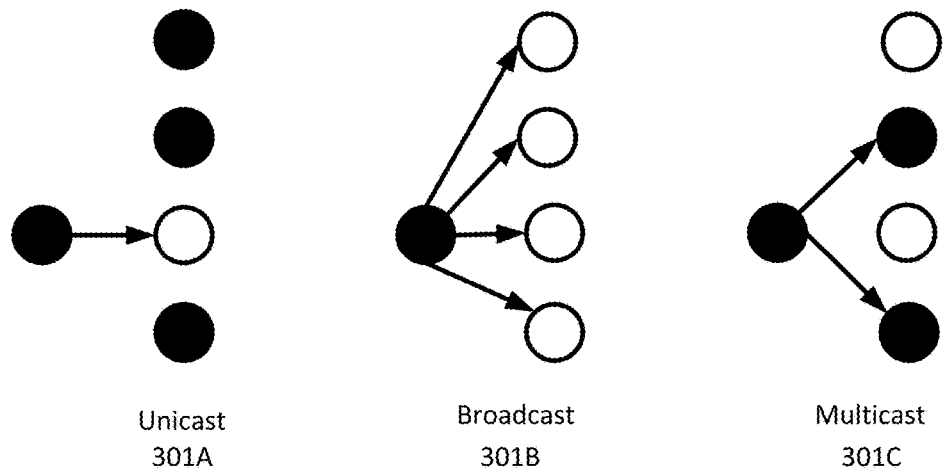
FIG. 3A illustrates three different packet types and how they are typically transmitted in a computer network.

Referring now to FIG. 3A, a plurality of different types of internet protocol (IP) packets may be used to communicate information through a computer network. A unicast 301A type of packet may be used to transmit a packet of information from a single originating source to a single destination or receiving target within a network. A broadcast 301B type of packet may be used to transmit a packet of information from a single originating source to a global set of destinations or receiving targets within a network. A multicast 301C type of packet may be used to transmit a packet of information from a single originating source to a specific group of destinations or receiving targets.

Figure 3B:
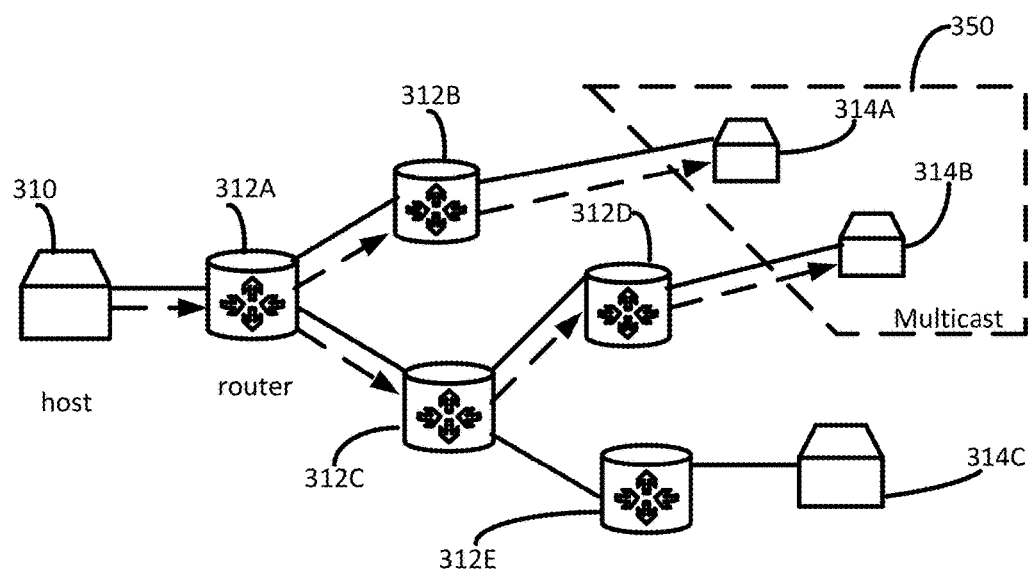
FIG. 3B illustrates a block diagram of a computer network with a pair of a plurality of computer servers being a member of a multicast group so that each member receives a multicast packet transmitted through the computer network.

Referring now to FIG. 3B, a computer network is shown illustrating how a multicast type of IP packet may be used to multicast information to a specific group of destinations. The computer network includes a plurality of converged network routers (CNR) 312A-312E, a host computer system 310, and a plurality of destination or target computer servers 314A-314C. The computer servers 314A-314B are designated to be part of a multicast group 350 that is known to each CNR 312A-312E.

A single IP packet that is designated a multicast packet to the multicast group 350 of the computer network is sent from the host 310 to the converged network router (CNR) 312A. Software or firmware of each CNR replicates the single packet as needed to further pass the multicast packet to the multicast group 350 in the computer network. The CNR 312A replicates the multicast packet and sends it out over the wire to the CNR 312B and the CNR 312C. The CNR 312B sends the multicast packet to the target computer server 314A that is a member of the multicast group 350. The CNR 312C sends the multicast packet to the CNR 312D. Because the computer server 314C is not part of the multicast group 350, the CNR 312C need not replicate and pass the multicast packet to the CNR 312E. The CNR 312D sends the multicast packet to the target computer server 314B that is a member of the multicast group 350.

Referring to FIG. 2, instead of a unicast boot message, a single multicast boot message 201Z may be sent from the provisioning server 102 to the CNS 104 and multicast by the CNS 104 to one or more of the respective plurality of CNAs 118A-118N and their computer servers. In this case, the CNS 104 receives the single multicast boot message 201Z and replicates the single boot message into a plurality of boot messages that are sent over the plurality of network interconnection cables (NIC) 105A-105N for delivery to the plurality of the converged network adapters (CNA) 118A-118N.

The CNAs 118A-118N further process the boot messages and use the virtual connections 109A-109N to the respective boot logical units (LUN) 204A-204N and a storage communication protocol (e.g., iSCSI or FCoE) to issue a LUN instruction to download an operating system image to/from the boot LUNs into the respective computer server 110. The computer server 110, and one or more virtual machines therein, may then boot up a desired operating system using the downloaded operating system image obtained from the respective boot LUNs.

Figure 5:
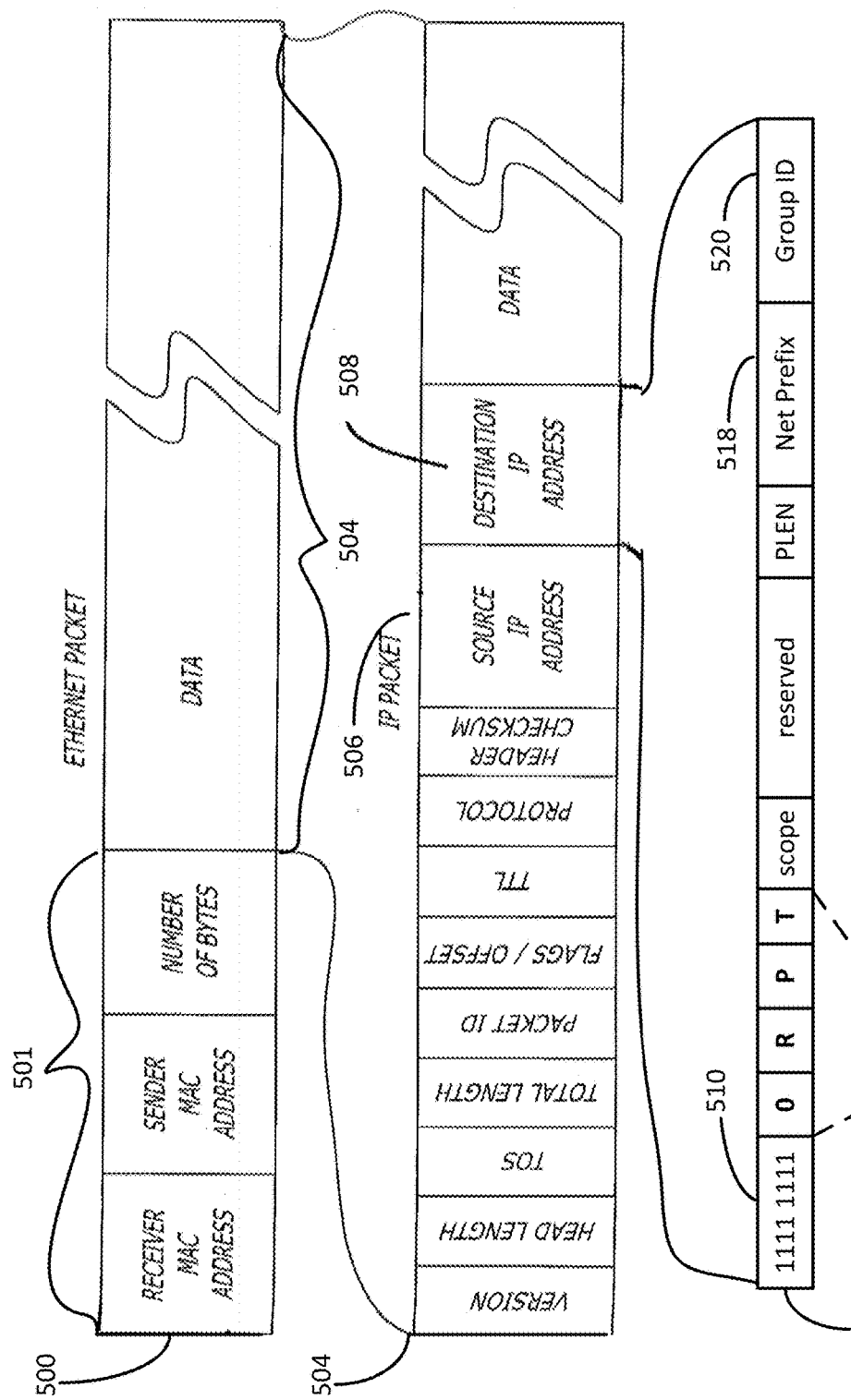
FIG. 5 illustrates a block diagram of an Ethernet packet including destination IP address fields to designate a multicast IP packet.

FIG. 5 illustrates a diagram of an Ethernet packet 500 with a header 501 and an IP packet 504. The header 501 may include a receiver mac address, a sender mac address, and the number of bytes in the internet protocol (IP) packet 504 that follows. The IP packet 504 includes a source IP address 506 and a destination IP address 508. The destination IP address 508 defines the type of IP packet 504, whether or not it is a unicast, multicast, or broadcast type of IP packet.

A multicast destination IP address 508M and IP packet is designated by an 8 bit prefix 510 having a binary value of 1111 1111 (FF hexadecimal) for any multicast address. A general unicast address uses a routing prefix instead. In contrast, the first 8 bits of a 10 bit prefix of a link-local unicast address uses the binary value of 1111 1110 (FE hexadecimal).

The multicast destination IP address 508M includes a 4 bit set of multicast address flags 511. The first bit and flag is reserved for future use and set to logic zero. The second bit, a rendezvous flag (R), is set to logic one if a rendezvous point (RP) is embedded. If the rendezvous point (RP) is not embedded, the rendezvous flag (R) is set to logic zero. The third bit, a prefix flag (P), is set to logic one if the destination address is based on a network prefix, the unicast based prefix identifier. Otherwise, the prefix flag (P) is set to logic zero when the destination address does not include network prefix information. The fourth bit, a transient flag (T), is set to logic one if the multicast address is dynamically assigned and not permanently assigned. If the transient flag (T) is set to logic zero, a well-known multicast address is used, one that is permanently assigned.

Typically, the multicast destination IP address 508M further includes the network prefix 518 and a group identifier 520 in a multicast IP packet. The group identifier 520 designates the group to which the CNAs and computer servers join to receive a multicast packet. In FIG. 3B, the computer servers 314A-314B are members of a group having a group identifier to receive multicast packets.

Referring now back to FIG. 2, an operating system software image that is to be instantiated multiple times in one or more servers, can be sent from the provisioning server 102 to the converged network switch 104 by using multicast packets, such as illustrated by the multicast message 201Z over the cable 103. The use of multicast packets avoids repeatedly sending the same operating system software image a plurality of times from provisioning server 102 to the converged network switch 104, such as illustrated by unicast messages 201A-201N over the cable 103. The converged network switch 104 replicates the multicast packet and sends it to the plurality of CNAs 118 in the one or more computer servers 110 or virtual machines in a computer server that are members to the same multicast group.

Data bandwidth between the provisioning server 102 and the converged network switch 104 is conserved by sending an operating system software image via multicast packets. Moreover with greater bandwidth, further time is reduced in repeatedly installing the same operating system software into the one or more computer servers 110 and/or virtual machines.

In FIG. 1B, if the CNA 118 receives a multicast packet from the provisioning server 102 through the CNS 104, it determines if it is a member of the multicast group to which the multicast packet is directed. If the CNA 118 is a member of the multicast group, the network function 122 of the CNA 118 joins the multicast group so that a plurality of multicast packets associated with the group can be received.

Figure 4:
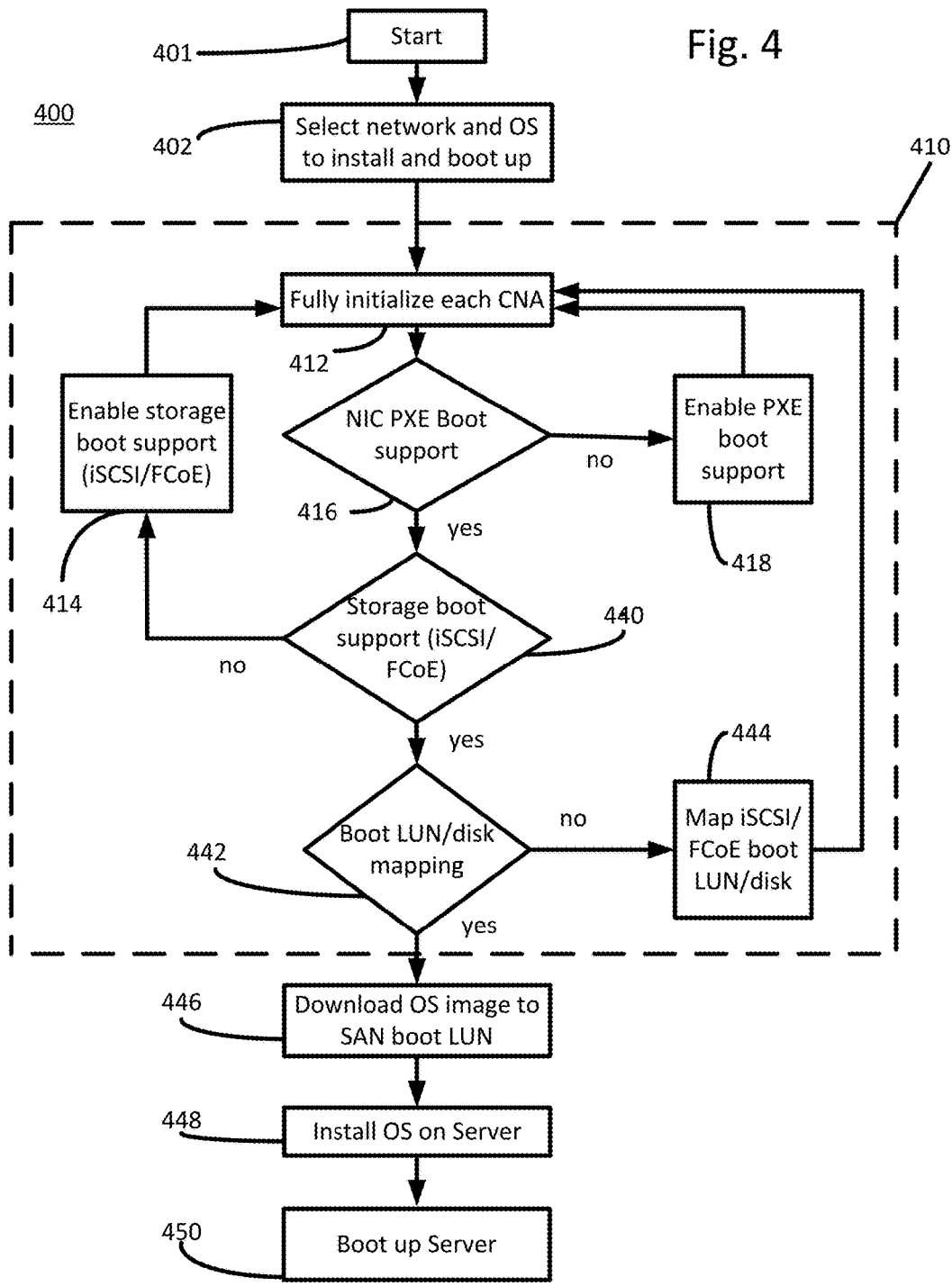
FIG. 4 illustrates a flow chart of a method of provisioning selected operating system software on a computer server, including the process of preparing a converged network adapter to support download operating system software from a storage area network device.

Methods of Installation and Boot Up of Operating System Software on a Computer Server Referring now to FIG. 4, a flow diagram is illustrated to discuss processes 400 of installing and booting up a computer server with operating system software, including the processes 410 taken by a converged network adapter (CNA) to facilitate the installation and booting up of operating system software on a computer server. In a network configured with a provisioning server, a converged network switch, a SAN device, and a computer server with a converged network adapter, such as shown in FIG. 1A, the process begins with process block 401 and goes to process block 402.

The provisioning server 102 shown in FIGS. 1A-1B typically has a network interface (NIC) adapter that can communicate to the computer servers 110 over a standard network with a network communication protocol, such as an Ethernet network with an Ethernet protocol. The provisioning server 102 typically communicates to a SAN device 106 through the CNS 104 to a CNA 118 in one of the one or more computer servers 110 using a network communication protocol, and then from the CNA 118 back through the CNS 104 to the SAN device 106 by using the storage communication protocol.

The logical units (LUNs) in the SAN device storing the operating software images may be referred to as boot logical units (boot LUNs). If the storage area network device 106 and the boot LUNs are not set up in advance, the CNA in a server may need to be configured to support the provisioning server so that OS images can be downloaded and written into boot LUNS of the SAN device, and then the OS images can be downloaded from the boot LUNs into the computer server to where it is to be installed and booted.

If the foregoing is established at block 401, at process block 402, provisioning software of the provisioning server 102 is used to select the type and version of operating system software, the computer network 100, and the one or more computer servers 110 which are to install and boot the selected type and version of operating system. Assuming one or more new servers are to be set up, the provisioning server 102 logs into each converged network adapter 118 of each computer server and performs the processes 410 taken by a converged network adapter (CNA) to facilitate the installation and booting up of operating system software on the computer server. The process goes to process block 412.

At process block 412, processes 410 for each CNA that is to be fully initialized to support the installation and booting up of operating system software on the computer server are performed. If all are fully initialized, then the decision blocks 416, 440 and 442 are all "YES" and the process jumps to process block 446.

At process block 416, a determination is made if the given CNA is enabled to provide provisioning server boot support through the network function by using a network communication protocol. If so, the process goes to process block 440. If not, the process goes to process block 418.

At process block 418, provisioning server boot support is enabled in the given CNA to download operating system images using the network communication protocol. The process next goes back to process block 412 and continues initializing the CNA and other CNAs in the network.

At process block 440, a determination is made if the given CNA is enabled to provide storage boot support through the storage function by using a storage communication protocol.

If so, the process goes to process block 442. If not, the process goes to process block 414.

At process block 414, storage boot support is enabled in the given CNA to store operating system images into boot LUNs of the targeted SAN device 106 to set it up for boot support and to download operating system images from boot LUNs in the targeted SAN device to install and boot up one or more operating systems in a computer server. The process next goes back to process block 412 and continues initializing the CNA and other CNAs in the network.

At process block 442, a determination is made if a boot LUN has been mapped for the given CNA and computer server. If not, the process goes to process block 444. If so, the process goes to process block 446.

At process block 444, a boot LUN is mapped to the storage function of a CNA port of a CNA and computer server. The process next goes back to process block 412 and continues fully initializing the CNA as needed and other CNAs in the network.

At process block 446, assuming the targeted SAN device has already been set up with operating system images, an operating system image is downloaded from the boot LUN into the computer server using the storage function of the converged network adapter port.

At process block 448, the operating system image is installed into the computer server by writing it into a storage device of the computer server. In this manner, the operating system software is installed from the boot LUN onto each computer server. The process then goes to process block 450.

At process block 450, for each CNA and computer server to be automatically booted up, one or more processors are caused to be booted-up with the operating system software downloaded from the boot LUN of the SAN device.

Prior to downloading an operating system image at process block 446, it may be the case that the operating system image has yet to be stored on the targeted SAN device. Additional steps may be taken to download the operating system image from the provisioning server and store it into one or more boot LUNs of the targeted SAN device.

A request for an operating system image may be sent to the provisioning server by using a network function of a converged network adapter port of a CNA. The operating system image may be downloaded from the provisioning server by using the network function of the converged network adapter port via a network communication protocol. Packets of data representing the operating system image may be temporarily stored in a buffer in the CNA. The operating system image may then be written into the boot LUN by using the storage function of the converged network adapter port and a storage communication protocol.

With the operating system image stored in a boot LUN, the process can continue with process block 446 and download the operating system image.

Computer Server with Converged Network Adapter

Figure 6A:
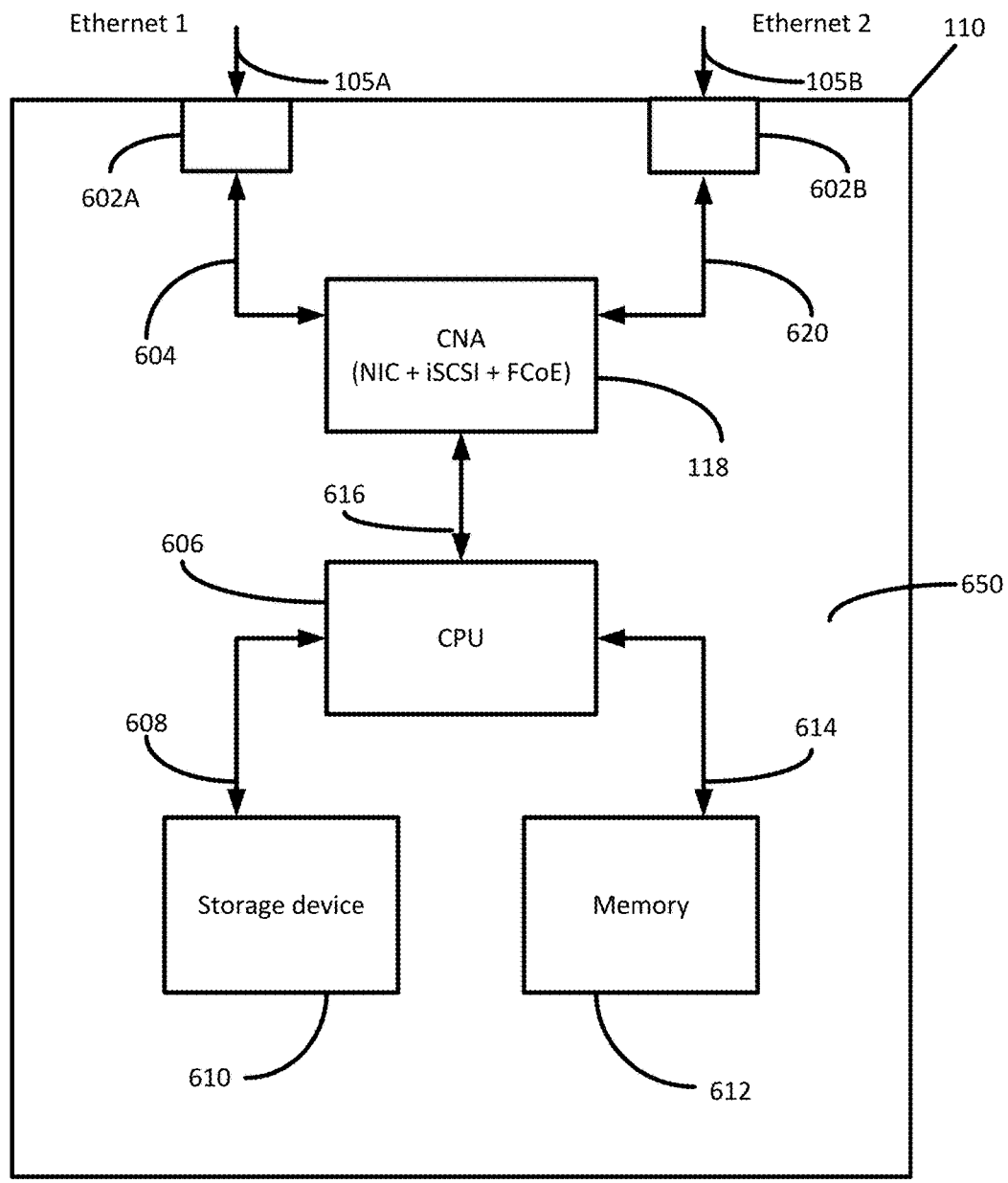
FIG. 6A illustrates a block diagram of a computer server with a converged network adapter (CNA).

Referring now to FIG. 6A, a block diagram of an example of a computer server 110 is shown that may be instantiated as the one or more computer servers 110 of FIGS. 1A-1B. The computer server 110 includes a pair of network communication ports 602A-602B with which one or two network communication cables 105A-105B (collectively cables 105) may couple. The computer server 110 couples to a computer network through the cables 105A-105B coupled to the ports 602A-602B.

The computer server 110 further includes a converged network adapter (CNA) 118, one or more processors or multiprocessors (CPU) 606, a storage device 610 (e.g., a storage drive), and a random access memory 612 coupled together by a plurality of wire traces 604, 608, 614, 616, 620 of a printed circuit board 650.

The converged network adapter (CNA) 118 supports multiple computer networking communication protocols for the pair of network communication ports 602A-602B including a standard network communications protocol, such as Ethernet communications protocol; and one or more storage network communications protocols, such as internet small computer system interface (iSCSI) communications protocol, and Fibre-Channel over Ethernet (FCoE) communications protocol. Accordingly, the converged network adapter (CNA) 118 concurrently supports the plurality of communication protocols that are used to command and control, download, and install operating system software into the computer server 110. The CNA 118 includes a buffer memory to temporarily store IP packets, including multicast IP packets, for later processing or transmission.

The storage device 610 stores software instructions of software applications that can be executed by the CPU 606. Operating system software may be downloaded from a boot LUN 160A-160N of the SAN device 106 shown in FIG. 1A and stored into the storage device 610. The computer server 110 and/or one or more virtual machines 150A-150N of the server shown in FIG. 1A can boot from the operating system software stored in the storage device 610.

Provisioning Server with Network Interface Adapter

Figure 6B:
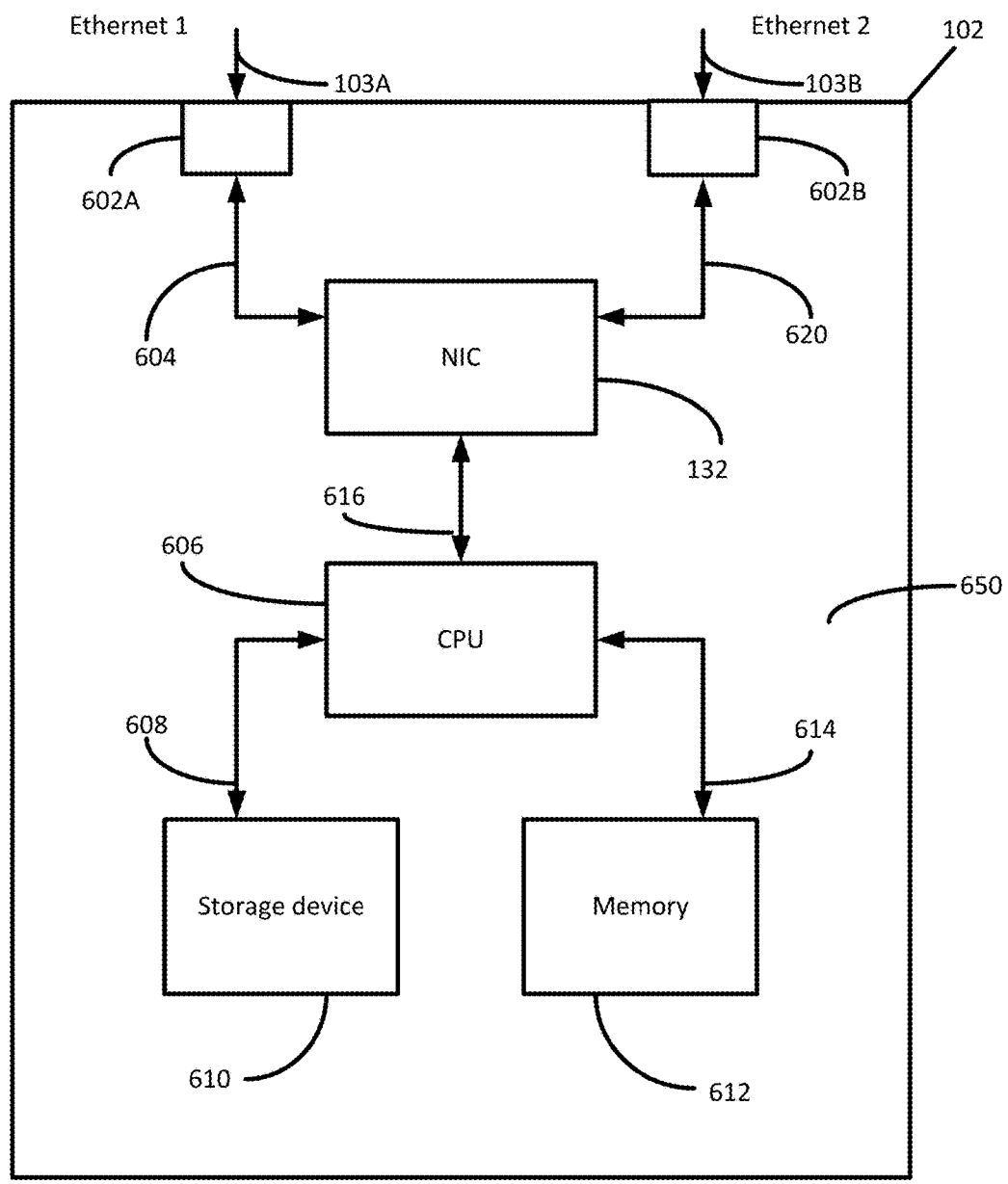
FIG. 6B illustrates a block diagram of a provisioning server with a network interface adapter (NIC).

Referring now to FIG. 6B, a block diagram of an example of a provisioning server 102 is shown that may be instantiated as the provisioning server 102 of FIGS. 1A-1B. In this example, the provisioning server is a preboot execution (PXE) server including provisioning software that is executed by a processor.

The provisioning server 102 includes a pair of network communication ports 602A-602B with which one or two network communication cables 103A-103B (collectively cables 103) may couple. The provisioning server 102 couples to a computer network through the cables 103A-130B coupled to the ports 602A-602B.

But for the network interface adapter (NIC) 132, the provisioning server 102 may have similar elements to that of the computer server 110 such as one or more processors or multiprocessors (CPU) 606, a storage device 610 (e.g., a storage drive), and a random access memory 612 coupled together by a plurality of wire traces 604, 608, 614, 616, 620 of a printed circuit board 650.

The network interface adapter 132 differs from a converged network adapter 118. The network interface adapter 132 uses a network communication protocol (e.g., Ethernet) to communicate with other computers in a network. The network interface adapter 132 does not typically support the storage communication protocols (e.g., iSCSI, FCoE, or RDMA).

Provisioning Software User Interface

Figure 7:
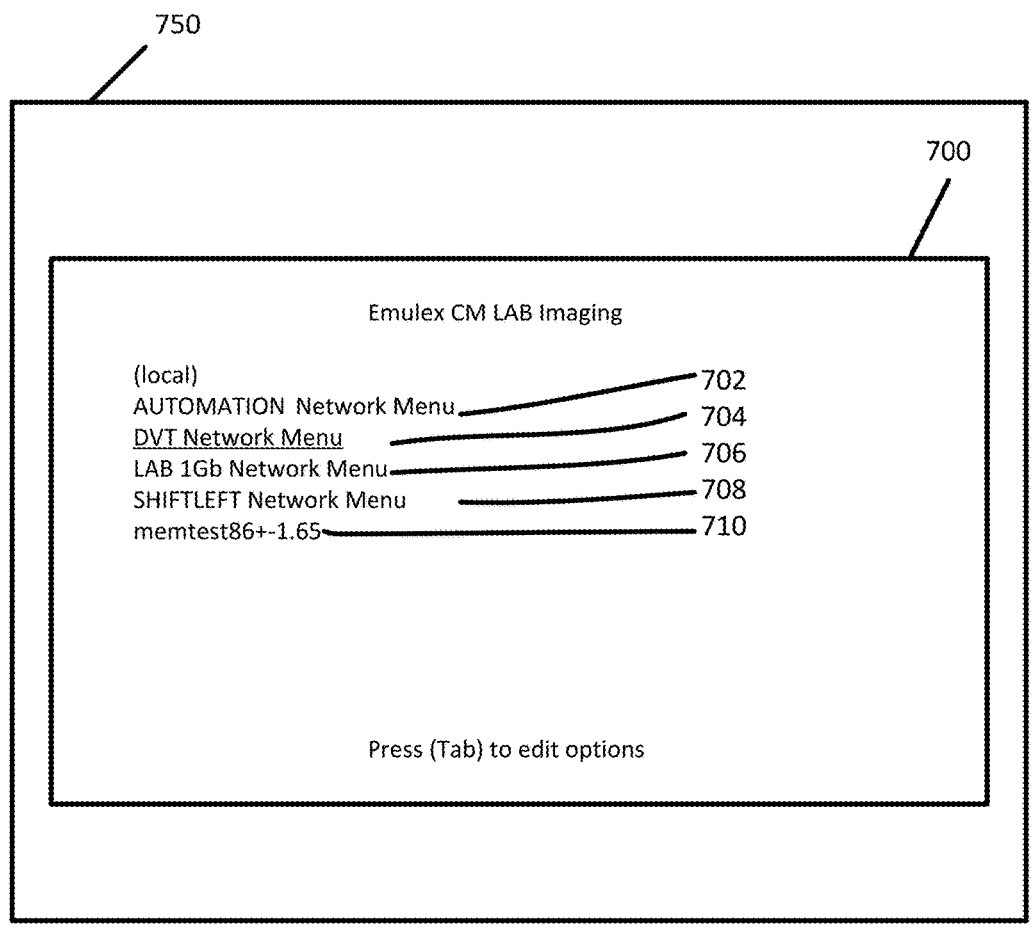
FIG. 7 illustrates a diagram of a display device displaying a computer network selection menu user interface window.

Referring now to FIG. 7, a processor 190 of the provisioning server 102 shown in FIG. 1A executes provisioning software 199 to install and upgrade operating system software on the one or more computer servers 110. The provisioning server 102 stores operating system (OS) boot images that are to be provisioned on a computer server. To prepare in advance for the installation, the provisioning server may write one or more operating software images into one or more respective logical units 160A-160N of a storage area network device 106, such as shown in FIG. 1A. Alternatively, a selected system image may be directly downloaded from a storage device of the provisioning server 102 into a computer server.

The provisioning software 199 includes instructions to provide a user interface to push the operating system (image) software out to the one or more computer servers 110 and/or their virtual machines. A display device 750 may be coupled to the provisioning server 102 or a remote client computer 112, such as shown in FIG. 1A, to display a user interface and user interface windows.

The provisioning software 199 generates a plurality of user interface windows 700,800,900,1000,1100 such as shown in FIGS. 7-11 on a display screen of a display device 750 of a client computer or the provisioning server. The plurality of user interface windows provide for the selection, execution and control of the provisioning software to selectively install or update operating system (OS) software on one or more computer servers in a selected computer network, if stored in a boot LUN of a SAN device, the provisioning software may point to a specific logical unit number (LUN) on the storage area network (SAN) device so it can be downloaded into the computer server.

FIG. 7 illustrates a computer network selection menu user interface window 700 displayed on the display device 750. The network selection menu user interface window 700 lists a menu of computer networks (also referred to as the main menu) for user selection that may be automatically provisioned and pushed with operating system software. The menu includes an automation network menu item 702 as the first option, a device verification test (DVT) network menu item 704 as the second option, a lab network menu item 706 as the third option, a SHIFTLEFT network menu item 708 as the fourth option, and a memory test network item (memtest86+−1.65) 710 as the fifth option.

A tab key of a keyboard may be pressed to highlight an option of the menu items for selection with a press of a carriage return key to select the option. Alternatively a mouse may be moved over to highlight an option of the menu items and a mouse click may be used to select the option. In FIG. 7, the DVT network menu is highlighted for selection and then selected.

Figure 8:
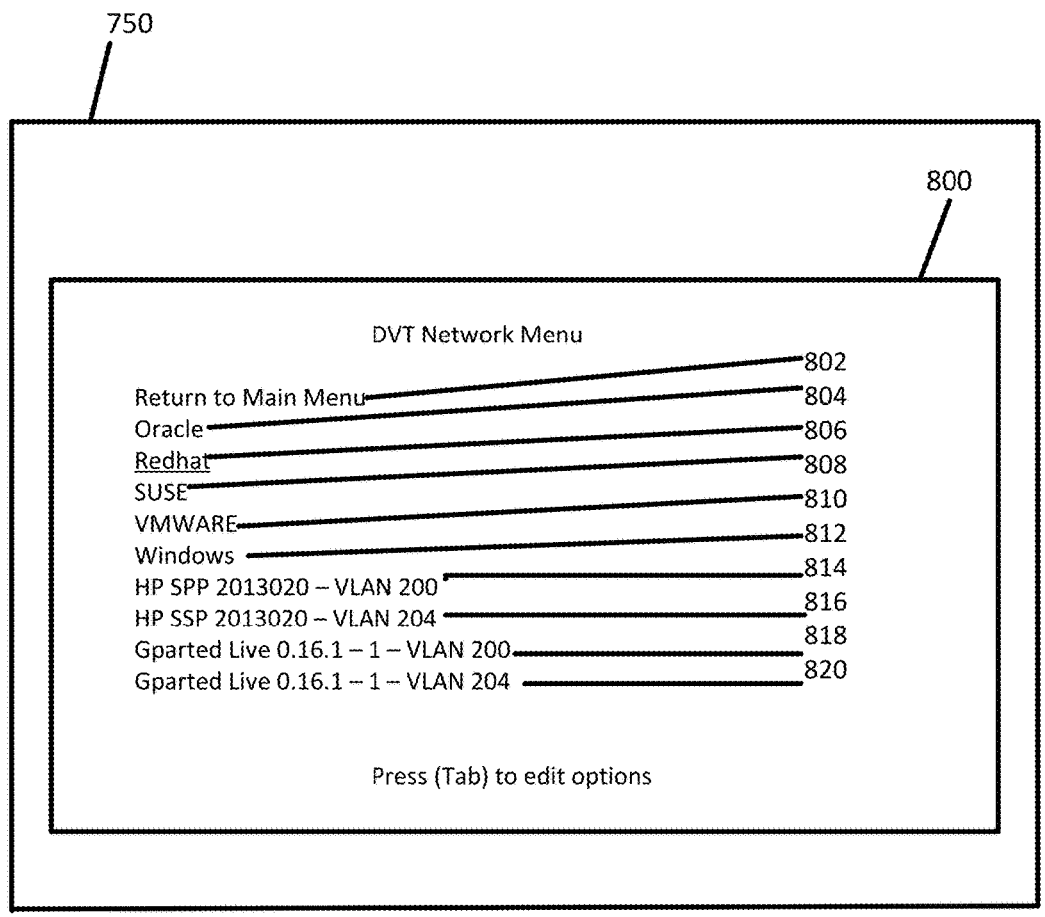
FIG. 8 illustrates a diagram of the display device displaying an operating system type selection menu user interface window associated with the selected computer network.

Referring now to FIG. 8, an operating system type selection menu user interface window 800 associated with a selected computer network is displayed on the display device 750. The operating system type selection menu user interface window 800 lists a menu of the types of operating system software images that are available to be automatically provisioned and pushed out to the computer servers in the selected computer network. The operating system type selection menu user interface window 800 provides a first menu option 802 for the user to select to return to main network menu user interface window 700 to select a different network. For example, the operating system type selection menu user interface window 800 provides as a second menu option 804 to select Oracle OS software, a third menu option 806 to select Redhat Linux OS software; a fourth menu option 808 to select SUSE Linux OS software; a fifth menu option 810 to select VMWARE OS software, a sixth menu option to select Microsoft Windows OS software, a seventh menu option 814 to select a first HP server OS software package with a first virtual LAN (HP SPP 2013020-VLAN 200); an eighth menu option 816 to select a second HP server OS software package with a second virtual LAN (HP SSP 2013020-VLAN 204). The ninth menu option 818 to select a first Gparted Live software with a first VLAN; and the tenth menu option 820 to select a second Gparted Live OS software with a second VLAN are partition editors to manage disk partitions. Thus, various operating system types, such as Linux, PC, MAC, or server operating system, may be chosen with the user interface window 800.

The third menu option 806, Redhat Linux OS software is highlighted by an underline in the window 800 on the display 750 as it is the option to be selected. Another step is taken, such as a carriage return or a mouse click, to select to install Redhat Linux OS software.

While the type of operating system software may have been chosen, there may be different versions of the selected type of operating system software. For example, Windows OS has versions 7.0, 7.1, 8.0, and 8.1 to choose from.

Figure 9:
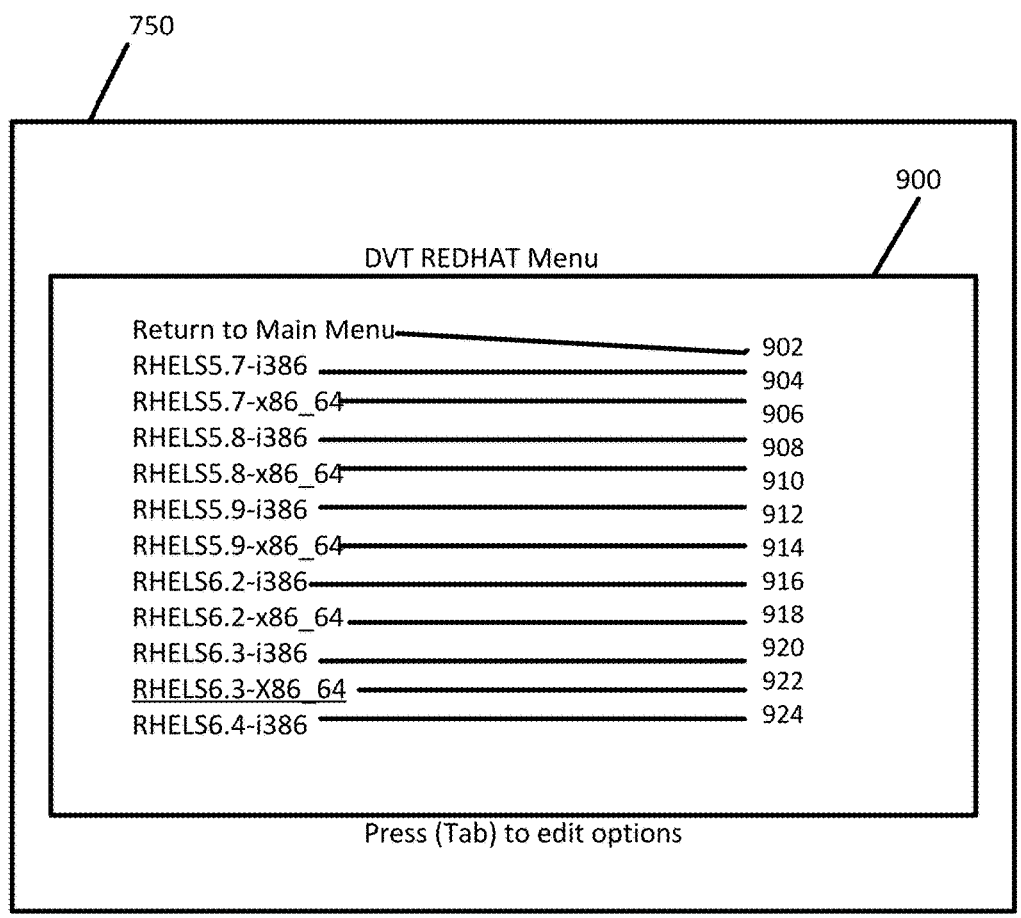
FIG. 9 illustrates a diagram of the display device displaying a release version selection user interface window that is associated with the selected type of operating system software.

Referring now to FIG. 9, a version selection user interface window 900 is displayed by the display device 750 associated with the selected type of operating system software. The version selection user interface window 900 provides a first menu option 902 for the user to select to return to main network menu user interface window 700 to select a different network.

Redhat Linux OS software was selected in the prior user interface window 800, the version selection user interface window 900 displays a plurality of different versions of Redhat Linux OS software at each of a plurality of menu options 904-924. For example, the version selection user interface window 900 provides as a second menu option 904 to select RHELS5.7-i386 version of the Redhat Linux OS, a third menu option 906 to select RHELS5.7-x86_64 version of the Redhat Linux OS, a fourth menu option 908 to select RHELS5.8-i386 version of the Redhat Linux OS, a fifth menu option 910 to select RHELS5.8-x86_64 version of the Redhat Linux OS, a sixth menu option 912 to select RHELS5.9-i386 version of the Redhat Linux OS, a seventh menu option 914 to select RHELS5.9-x86_64 version of the Redhat Linux OS, a eighth menu option 916 to select RHELS6.2-i386 version of the Redhat Linux OS, a ninth menu option 918 to select RHELS6.2-x86_64 version of the Redhat Linux OS, a tenth menu option 920 to select RHELS6.3-i386 version of the Redhat Linux OS, a eleventh menu option 922 to select RHELS6.3-x86_64 version of the Redhat Linux OS, and a twelfth menu option 924 to select RHELS6.4-i386 version of the Redhat Linux OS.

The eleventh menu option 922, RHELS6.3-x86_64 version of the Redhat Linux OS software, is highlighted by an underline in the window 900 on the display 750 as it is the option to be selected. Another step is taken, such as a carriage return or a mouse click, to select to install the selected version of the selected type of operating system software.

While the type and version of operating system software may have been chosen, there may still be different versions of the operating system software for different hardware or processors. For example, Windows OS has different versions of software for different bit widths of a processor and instructions.

Referring now to FIG. 10, a hardware specific operating system user interface window 1000 is displayed by the display device 750. The hardware specific operating system user interface window 1000 provides a first menu option 1002 for the user to select to return to main network menu user interface window 700 to restart the selection process.

The hardware specific operating system user interface window 1000 displays choices of a plurality of different bit widths of operating system versions of Windows OS software at each of a plurality of menu options 1004-1006. For example, the hardware specific operating system user interface window 1000 provides as a second menu option 1004 to select a Windows 64 bit operating system software, and as a third menu option 1006 to select a Windows 32 bit operating system software.

The selected type and version of operating system may point to a boot logical unit 160A-160N in the SAN device 106, such as shown in FIGS. 1A-1B, where an image of the selected operating system is stored. Before operating system software can be installed by a user on a computer, the user may be required to log into the computer to show that he or she has authority to set it up to receive, install, and boot up the selected operating system software.

Referring now to FIG. 11, a login user interface window 1100 is displayed by the display device 750. An IP address 1101 is displayed in the login user interface window 1100 indicating the computer server into which the user is to login to and push an operating system image to it for install and boot up. If this is not the proper computer server IP address, a different computer or computer server can be selected by inputting its IP address into the blank IP address field 1104.

Assuming the IP address 1101 is proper, a username or login ID field 1102 and a password field 1103 may be displayed in the login user interface window 1100. To push the selected OS system into the computer or computer server, the user inputs his username/login ID and password into the respective fields 1101,1102. The login user interface window 1100 further displays a cancel button 1106 and a login button 1108 that can be selected. To cancel the OS install process, the user selects the cancel button 1106 in the login user interface window 1100 with a mouse or keyboard strokes. To kick of the automated OS installation and boot up process, the user instead selects the log in button 1108 in the login user interface window 1100 with a mouse or keyboard strokes.

With the automated OS installation and boot up process kicked off, the methods described herein are followed to install into and boot up the operating system on the computer or computer server. To support the automated provisioning, installation and boot up of a selected type and version of operating system, the various types and versions of operating system images are stored in a boot logical unit 160A-160N of the SAN device 106 shown in FIG. 1A.

Storage Area Network Device with Boot Logical Units

Referring now to FIG. 12, a block diagram of a targeted storage area network (SAN) device 1200 with a plurality of boot logical units (LUNs) LUN1 1202A through LUNN 1202N is shown. The SAN device 1200 may be an instance of the SAN device 106 shown in FIGS. 1A-1B that includes a storage adapter 134 in communication with the boot LUNs and a computer network through one or more cables 107. The SAN device 1200 may be used in a local area network with a known set of computer servers. This may be the case for example of a single tenant user environment within a data center.

The boot LUN numerical assignments identified by a starting address into the SAN device are associated with images of operating systems (OS). For example, LUN1 1202A is allocated to store OS image Version 1 1216A. LUN2 1202B through LUN4 1202D are allocated to store OS image version 2A 1216B, OS image version 2B 1216C, and OS image version 2C 1216D. LUN 5 1202E is allocated to store OS image version 3 1216E. LUN 6 1202F is allocated to store OS image version 4 1216F. Generally, LUN N 1202N is allocated to store OS image version N 1216N.

The provisioning software may be used to select the operating system image and associated LUN number. The computer servers are given the starting address and the logical unit number from which the selected operating system image may be downloaded into the computer server and then booted up. While the SAN device 1200 may be used for a single tenant and unique LAN, a SAN device with boot LUNs may be set up to support multiple tenants and multiple networks.

Referring now to FIG. 13, a block diagram of a targeted storage area network (SAN) device 1300 with a plurality of boot logical units to support a plurality of different groups of computer servers is shown. For example, a first plurality of boot logical units (LUNs) LUN1 1302A through LUNN 1302N are used to support the OS install and boot up a first group of servers. A second plurality of boot logical units (LUNs) LUN1' 1328A through LUNN' 1328N are used to support the OS install and boot up of a second group of servers. In this manner, the target SAN device 1300 in a data center can be used in a multi-tenant user environment to support different groups of servers.

The SAN device 1300 may be an instance of the SAN device 106 shown in FIGS. 1A-1B that includes a storage adapter 134 in communication with the boot LUNs and a computer network through one or more cables 107.

For the first group of boot LUNs in the SAN device 1300, the boot LUN numerical assignments identified by a starting address into the SAN device are associated with images of operating systems (OS). For example, LUN1 1302A is allocated to store OS image Version 1 1316A. LUN2 1302B through LUN4 1302D are allocated to store OS image version 2A 1316B, OS image version 2B 1316C, and OS image version 2C 1316D. LUN 5 1302E is allocated to store OS image version 3 1316E. LUN 6 1302F is allocated to store OS image version 4 1316F. Generally, LUN N 1302N is allocated to store OS image version N 1316N.

For the second group of boot LUNs in the SAN device 1300, the boot LUN numerical assignments identified by a starting address into the SAN device are associated with images of operating systems (OS). For example, LUN 1' 1328A is allocated to store OS image Version 1' 1338A. LUN 2' 1328B through LUN 4' 1328D are allocated to store OS image version 2A' 1338B, OS image version 2B' 1338C, OS image version 2C' 1338D. LUN 5' 1328E is allocated to store OS image version 3' 1338E. LUN 6' 1328F is allocated to store OS image version 4' 1338F. Generally, LUN N' 1328N is allocated to store OS image version N' 1338N.

Automated Testing of Computer Servers and Virtual Machines

Once the operating system software is installed and the computer servers 110 and/or virtual machines 150A-150N are booted up with the operating system, it is desirable to automatically test that the computer server and its virtual machines are properly functional before allowing remote clients to use the virtual machine or server.

An instance of automated test process software 195 shown in FIG. 1A may also be installed by the provisioning server onto each computer server 110 and/or each virtual machine 150A-150N. The automated test process software may be TESTSHELL RUNNER test executor software by QualiSystems Ltd. The automated test process software can repeatedly run automated test scenarios to test workflows, tasks, databases and application software that is expected to be executed by the computer server and/or its virtual machines.

When implemented in software, elements of the embodiments comprise the code segments or instructions to perform the functional tasks described herein. The code segments or instructions are executable by a processor, such as CPU 202 illustrated in FIG. 2, and can be stored in a storage device or a processor readable storage medium, such as storage device 201 or memory 204 illustrated in FIG. 2, awaiting execution. The processor readable storage medium may include any medium that can store information. Examples of the processor readable storage medium include an electronic circuit, a semiconductor memory device, a read only memory (ROM), a flash memory, an erasable programmable read only memory (EPROM), a floppy diskette, a CD-ROM, an optical disk, and/or a hard disk. The code segments or instructions may be downloaded via computer networks such as the Internet, Intranet, etc. into the processor readable storage medium.

Various combinations and sub-combinations, and modifications as may be made, of the presently disclosed components and embodiments and aspects are contemplated whether or not specifically disclosed, to the extent and as would be apparent to one of ordinary skill based upon review of this disclosure and in order to suit a particular intended purpose or application.

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the claimed invention is limited only by patented claims that follow below.

What is claimed is:

1. A method for a computer network including a storage area network (SAN) device, the method comprising:
    mapping at least one boot logical unit (LUN) of the SAN device to a communication port of at least one converged network adapter (CNA) belonging to at least one computer server;
    sending one or more operating system (OS) images from a provisioning server to a converged network switch, the converge network switch supporting a plurality of computer communication protocols through a plurality of communication ports;
    sending the one or more operating system images from the converged network switch to the communication port of the at least one converged network adapter using a first network communication protocol;
    downloading at least one of the one or more operating system software images through the converged network switch to the communication port of the at least one converged network adapter using the first network communication protocol;
    writing the at least one operating system image into the at least one boot logical unit of the SAN device through the communication port of the at least one CNA using a second communication protocol; and
    booting the at least one computer server with the at least one operating system image stored in the at least one boot logical unit of the SAN device.

2. The method of claim 1, wherein
    the mapping of the at least one boot LUN of the SAN device to the communication port is in response to a storage function of the communication port of the at least one CNA, and
    the writing of the at least one operating system image into the at least one boot logical unit of the SAN device is in response to the storage function of the communication port of the at least one CNA; and
    the sending of the one or more operating system images from the converged network switch to the communication port of the at least one CNA is in response to a network function of the communication port of the at least one CNA, and
    the downloading of at least one of the one or more operating system software images through the converged network switch to the communication port of the at least one CNA is in response to the network function of the communication port of the at least one CNA.

3. The method of claim 1, wherein
    the first computer communication protocol is a network communication protocol; and
    the second computer communication protocol is a storage communication protocol.

4. The method of claim 3, wherein
    the network communication protocol is an Ethernet protocol; and
    the storage communication protocol is Internet Small Computer Systems Interface (iSCSI).

5. The method of claim 3, wherein
    the network communication protocol is an Ethernet protocol; and
    the storage communication protocol is Fibre Channel over Ethernet (FCoE).

6. The method of claim 1, wherein
    the provisioning server is a preboot execution (PXE) server.

7. The method of claim 1, wherein the sending of the one or more operating system images from the converged network switch is to a first plurality of communication ports of a first plurality of converged network adapters in a first plurality of computer servers, and the method further includes
    joining the first plurality of communication ports of the first plurality of converged network adapters to a first operating system image multicast group; and
    multicasting one operating system image from the converged network switch to the first plurality of communication ports of the first plurality of converged network adapters in the first plurality of computer servers that are members of the first operating system image multicast group.

8. The method of claim 7, wherein
    the multicasting of the one operating system image avoids sending a plurality of operating system images from the provisioning server to the converged network switch to conserve bandwidth and time in installing operating system software.

9. The method of claim 7, wherein
    the multicasting of the one or more operating system images is performed by using a plurality of multicast data packets having the same multicast group IP address for the first plurality of computer servers.

10. The method of claim 7, wherein
    the joining of the first plurality of communication ports of the first plurality of converged network adapters to the first operating system image multicast group is in response to the network function of the communication port of the at least one CNA, and the downloading of the at least one of the one or more operating system software images into the computer server is from the provisioning server.

11. The method of claim 7, wherein
the joining of the first plurality of communication ports of the first plurality of converged network adapters to the first operating system image multicast group is in response to the storage function of the communication port of the at least one CNA, and
the downloading of the at least one of the one or more operating system software images into the computer server is from the SAN device.

12. The method of claim 7, wherein the sending of a second one or more operating system images from the converged network switch is to a second plurality of communication ports of a second plurality of converged network adapters in a second plurality of computer servers, and the method further includes
joining the second plurality of communication ports of the second plurality of converged network adapters to a second operating system image multicast group; and
multicasting one operating system image from the converged network switch to the second plurality of communication ports of the second plurality of converged network adapters in the second plurality of computer servers that are members of the second operating system image multicast group.

13. A method for a plurality of converged network adapters in a respective plurality of computer servers in a computer communication network, the method comprising: for each converged network adapter in each computer server,
enabling provisioning server boot support to download operating system images by using a first computer communication protocol;
enabling storage boot support to map to a boot logical unit (LUN) in a targeted storage area network device;
mapping the boot LUN to a storage function of a converged network adapter port;
causing a plurality of processors of a computer server to boot with an operating system stored in the boot LUN using a second computer communication protocol differing from the first computer communication protocol, wherein prior to causing the plurality of processors in the computer server to boot with the operating system, the method further comprises:
sending a request for an operating system image to a provisioning server by using a network function of the converged network adapter port;
downloading the operating system image from the provisioning server by using the network function of the converged network adapter port; and
writing the operating system image into the boot LUN by using the storage function of the converged network adapter port.

14. The method of claim 13, wherein
the first computer communication protocol is a computer network communication protocol and the second communication protocol is a storage network communication protocol.

15. The method of claim 13, wherein prior to causing the plurality of processors in the computer server to boot with the operating system, the method further comprises:
downloading the operating system image from the boot LUN by using the storage function of the converged network adapter port; and
writing the operating system image into a storage device of the computer server.

16. The method of claim 13, wherein prior to causing the plurality of processors in the computer server to boot with the operating system, the method further comprises:
downloading the operating system image from the boot LUN by using the storage function of the converged network adapter port; and
writing the operating system image into a storage device of the computer server.

17. The method of claim 13, further comprising:
installing automated test process software onto the storage device of the computer server;
executing the automated test process software; and
repeatedly executing one or more automated test scenarios to test workflows, tasks, databases, and application software that is expected to be executed by the computer server and the booted operating system software.

* * * * *